United States Patent
Bourane et al.

(10) Patent No.: US 9,663,725 B2
(45) Date of Patent: May 30, 2017

(54) CATALYTIC COMPOSITIONS USEFUL IN REMOVAL OF SULFUR COMPOUNDS FROM GASEOUS HYDROCARBONS, PROCESSES FOR MAKING THESE AND USES THEREOF

(75) Inventors: Abdennour Bourane, Ras Tanura (SA); Omer Refa Koseoglu, Dhahran (SA); Zinfer Ismagilov, Novosibirsk (RU); Svetlana Yashnik, Novosibirsk (RU); Mikhail Kerzhentsev, Novosibirsk (RU); Valentin Parmon, Novosibirsk (RU)

(73) Assignees: Saudi Arabian Oil Company, Dhahram (SA); Boreskov Institute of Catalysis, Novosibirsk (RU)

( * ) Notice: Subject to any disclaimer, the term of this patent is extended or adjusted under 35 U.S.C. 154(b) by 304 days.

(21) Appl. No.: 13/491,815

(22) Filed: Jun. 8, 2012

(65) Prior Publication Data

US 2013/0028822 A1     Jan. 31, 2013

Related U.S. Application Data

(63) Continuation-in-part of application No. 13/191,939, filed on Jul. 27, 2011.

(51) Int. Cl.
*C10G 27/04* (2006.01)
*C10G 29/16* (2006.01)
(Continued)

(52) U.S. Cl.
CPC ............ *C10G 27/04* (2013.01); *B01J 23/005* (2013.01); *B01J 23/80* (2013.01); *B01J 23/83* (2013.01);
(Continued)

(58) Field of Classification Search
CPC .......... C10G 27/04; C10G 29/16; B01J 21/04; B01J 23/72; B01J 23/80; B01J 23/83;
(Continued)

(56) References Cited

U.S. PATENT DOCUMENTS 3,063,936 A   11/1952   Pearce et al.
2,640,010 A   5/1953    Hoover
(Continued)

FOREIGN PATENT DOCUMENTS

EP     034338 A2    8/1981
EP     234745 A1    9/1987
(Continued)

OTHER PUBLICATIONS

Cheng-Chung Chang et al., "Oxidative Steam Reforming of Methanol Over CuO/ZnO/CeO2/ZrO2/Al2O3 Catalysts," Int. J. Hydrogen Energy 35:7675-7683 (2010).
(Continued)

*Primary Examiner* — Renee Robinson
(74) *Attorney, Agent, or Firm* — Abelman, Frayne & Schwab

(57) ABSTRACT

A catalytic composition is disclosed, which exhibits an X-ray amorphous oxide, with a spinel formula and highly dispersed crystals of ZnO, CuO, and optionally $CeO_2$. The composition is useful in oxidative and adsorptive processes for removing sulfur from gaseous hydrocarbons.

17 Claims, 1 Drawing Sheet

(51) Int. Cl.

| | |
|---|---|
| *B01J 23/80* | (2006.01) |
| *B01J 37/03* | (2006.01) |
| *B01J 23/94* | (2006.01) |
| *B01J 23/00* | (2006.01) |
| *B01J 23/83* | (2006.01) |
| *B01J 35/00* | (2006.01) |
| *B01J 35/10* | (2006.01) |

(52) U.S. Cl.
CPC ............ *B01J 23/94* (2013.01); *B01J 35/006* (2013.01); *B01J 35/1014* (2013.01); *B01J 35/1038* (2013.01); *B01J 35/1061* (2013.01); *B01J 37/031* (2013.01); *C10G 29/16* (2013.01); *C10G 2300/202* (2013.01)

(58) Field of Classification Search
CPC . B01J 23/94; B01J 35/006; B01J 35/08; B01J 35/1014; B01J 35/1061; B01J 37/009; B01J 37/03; B01J 37/031; B01J 37/06; B01J 37/08
USPC .......... 208/246–248; 510/304, 342, 346, 355
See application file for complete search history.

(56) References Cited

U.S. PATENT DOCUMENTS

| | | | |
|---|---|---|---|
| 3,617,523 | A | 11/1971 | Spurlock et al. |
| 3,945,914 | A | 3/1976 | Yoo et al. |
| 4,252,635 | A | 2/1981 | Blanton, Jr. |
| 4,263,020 | A | 4/1981 | Eberly, Jr. |
| 4,596,782 | A | 6/1986 | County et al. |
| 4,621,069 | A | 11/1986 | Ganguli |
| 4,985,074 | A | 1/1991 | Okada |
| 5,108,968 | A | 4/1992 | Ellingham et al. |
| 5,573,988 | A | 11/1996 | Didillon |
| 5,837,637 | A | 11/1998 | Reeg et al. |
| 5,880,050 | A | 3/1999 | Boitiaux et al. |
| 5,953,911 | A | 9/1999 | Guth et al. |
| 6,037,307 | A | 3/2000 | Campbell et al. |
| 6,521,196 | B2 | 2/2003 | Campbell et al. |
| 6,627,572 | B1 | 9/2003 | Cai et al. |
| 7,291,259 | B2 | 11/2007 | Gupta et al. |
| 7,749,375 | B2 | 7/2010 | Kokayeff et al. |
| 2003/0178343 | A1 | 9/2003 | Chen et al. |
| 2004/0159583 | A1* | 8/2004 | Mesters et al. ........... 208/208 R |
| 2005/0098478 | A1 | 5/2005 | Gupta et al. |
| 2005/0150819 | A1* | 7/2005 | Wachs ...................... 208/208 R |
| 2006/0054536 | A1* | 3/2006 | Fujikawa et al. ......... 208/216 R |
| 2006/0111233 | A1 | 5/2006 | Xiao et al. |
| 2009/0148374 | A1* | 6/2009 | Choi ........................ 423/244.03 |
| 2009/0288993 | A1* | 11/2009 | Long et al. .................... 208/243 |

FOREIGN PATENT DOCUMENTS

| | | |
|---|---|---|
| EP | 1077081 A2 | 2/2001 |
| EP | 2067527 A1 | 10/2007 |
| EP | 2135673 A1 | 12/2009 |
| JP | 2004-195445 A | 7/2004 |

OTHER PUBLICATIONS

Omer R. Koseoglu et al., "Predicting Hydrotreating Catalyst Deactivation Rate," Saudi Aramco Journal of Technology, 66-71 (Summary, 2008).

Patel, et al., "Selective Production of Hydrogen Via Oxidative Steam Reforming of Methanol Using Cu—Zn—Ce—Al Oxide Catalysts," Chen. Engr. Sci 62:5436-5443 (2007).

Lida Gao, et al., "Hydrotalcite-like Compounds Derived CuZnAl Oxide Catalysts for Aerobic Oxidative Removal of Gasoline-Range Organosulfur Compounds" Energy As Fuels 23:624-630 (2009).

M.J.L. Ginés, et al., "Activity and Structure-Sensitivity of the Water-Gas Shift Reaction Over Cu—Zn—Al Mixed Oxide Catalysts," App. Catalyses A: General 131:283-296 (1995).

Lida Gao, Energy & Fuels, 23, 624-630, 2009, American Chemical Society.

\* cited by examiner

US 9,663,725 B2

CATALYTIC COMPOSITIONS USEFUL IN REMOVAL OF SULFUR COMPOUNDS FROM GASEOUS HYDROCARBONS, PROCESSES FOR MAKING THESE AND USES THEREOF

RELATED APPLICATION

This application is a continuation-in-part of application Ser. No. 13/191,939 filed Jul. 27, 2011, incorporated by reference in its entirety.

FIELD OF THE INVENTION

This invention relates to methods for removing sulfur-containing compounds from hydrocarbons. More particularly, it relates to such methods, using an oxidative and/or adsorptive process in the presence of a newly described catalyst, where the hydrocarbons are in gaseous phase. The catalytic compositions and processes for making these are also part of the invention.

BACKGROUND AND PRIOR ART

The discharge into the atmosphere of sulfur compounds during processing and end-use of the petroleum products derived from sulfur-containing sour crude oil pose health and environmental problems. The stringent, reduced-sulfur specifications applicable to fuel products have impacted the refining industry, and made it necessary for refiners to take expensive and complex actions so as to reduce the sulfur content in gas oils to 10 parts per million by weight (ppmw) or less. In industrialized nations such as the United States, Japan and the countries of the European Union, refineries for transportation fuel are already required to produce environmentally clean products. For instance, in 2007 the United States Environmental Protection Agency began requiring the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 and thereafter to contain less than 10 ppmw of sulfur. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must now choose from processes and/or crude oils that provide flexibility so that future specifications relating to lower sulfur levels may be met with minimum additional capital investment, while using existing equipment. Conventional technologies such as hydrocracking and two-stage hydrotreating offer alternative solutions for production of clean transportation fuels. These technologies are available and can be applied as new grassroots production facilities are constructed; however, many existing hydroprocessing facilities, such as those using relatively low pressure hydrotreaters, represent substantial prior investments and were constructed before these more stringent sulfur reduction requirements were enacted. It is very difficult to upgrade existing hydrotreating reactors in these facilities because of the comparatively more severe operational requirements (e.g., higher temperature and pressure) needed to produce so-called "clean" fuel. Available retrofitting options for refiners include elevation of the hydrogen partial pressure by increasing the recycled gas quality, utilization of more active catalyst compositions, installation of improved reactor components to enhance liquid-solid contact, increase of reactor volume, and improvement of feedstock quality.

There are many hydrotreating units installed worldwide, which produce transportation fuels containing 500-3000 ppmw sulfur. These units were designed for, and are being operated at, relatively mild conditions (e.g., low hydrogen partial pressures of 30 kilograms per square centimeter for straight run gas oils with boiling points in the range of 180° C.-370° C.

The increasing prevalence of more stringent environmental sulfur specifications with the maximum allowable sulfur levels reduced to no greater than 15 ppmw, and in some cases no greater than 10 ppmw, present difficult challenges. This ultra-low level of sulfur in the end product typically requires either construction of new high pressure hydrotreating units, or a substantial retrofitting of existing facilities, e.g., by integrating new reactors, incorporating gas purification systems, reengineering internal configurations and components of reactors, and/or deployment of more active catalyst compositions.

Sulfur-containing compounds that are typically present in hydrocarbon fuels include aliphatic molecules such as sulfides, disulfides and mercaptans, as well as aromatic molecules such as thiophene, benzothiophene and its long chain alkylated derivatives, dibenzothiophene, and its alkyl derivatives such as 4,6-dimethyldibenzothiophene. Aromatic sulfur-containing molecules have a higher boiling point than aliphatic sulfur-containing molecules, and are consequently more abundant in higher boiling fractions.

In addition, certain fractions of gas oils possess different properties. The following table illustrates the properties of light and heavy gas oils derived from Arabian Light crude oil:

TABLE 1

| Feedstock Name | | Light | Heavy |
|---|---|---|---|
| Blending Ratio | | — | — |
| API Gravity | ° | 37.5 | 30.5 |
| Carbon | W % | 85.99 | 85.89 |
| Hydrogen | W % | 13.07 | 12.62 |
| Sulfur | W % | 0.95 | 1.65 |
| Nitrogen | ppmw | 42 | 225 |
| ASTM D86 Distillation | | | |
| IBP/5 V % | ° C. | 189/228 | 147/244 |
| 10/30 V % | ° C. | 232/258 | 276/321 |
| 50/70 V % | ° C. | 276/296 | 349/373 |
| 85/90 V % | ° C. | 319/330 | 392/398 |
| 95 V % | ° C. | 347 | |
| Sulfur Speciation | | | |
| Sulfur Compounds Boiling Less than 310° C. | ppmw | 4591 | 3923 |
| Dibenzothiophenes | ppmw | 1041 | 2256 |
| $C_1$-Dibenzothiophenes | ppmw | 1441 | 2239 |
| $C_2$-Dibenzothiophenes | ppmw | 1325 | 2712 |
| $C_3$-Dibenzothiophenes | ppmw | 1104 | 5370 |

As set forth above in Table 1, the light and heavy gas oil fractions have ASTM D85 95 V % points of 319° C. and 392° C., respectively. Further, the light gas oil fraction contains less sulfur and nitrogen than the heavy gas oil fraction (0.95 W % sulfur as compared to 1.65 W % sulfur and 42 ppmw nitrogen as compared to 225 ppmw nitrogen).

Advanced analytical techniques such as multi-dimensional gas chromatography (Hua R., et al., *Journal of Chromatog. A,* 1019 (2003) 101-109), have shown that the middle distillate cut boiling in the range of 170-400° C.

contains sulfur species including thiols, sulfides, disulfides, thiophenes, benzothiophenes, dibenzothiophenes, and benzonaphthothiophenes, with and without alkyl substituents.

The sulfur specification and content of light and heavy gas oils are conventionally analyzed by two methods. In the first method, sulfur species are categorized based on structural groups. The structural groups include one group having sulfur-containing compounds boiling at less than 310° C., including dibenzothiophenes and their alkylated isomers, and another group including 1, 2, and 3 methyl-substituted dibenzothiophenes, denoted as $C_1$, $C_2$ and $C_3$, respectively. Based on this method, the heavy gas oil fraction contains more alkylated di-benzothiophene molecules than the light gas oils.

In the second method of analysis, the sulfur content of light and heavy gas oils are plotted against the boiling points of the sulfur-containing compounds to observe concentration variations and trends. See, e.g., FIG. 1 of Koseoglu, et al., *Saudi Aramco Journal of Technology*, 66-79 (Summer 2008), incorporated by reference. Note that the boiling points depicted are those of sulfur-containing compounds that were detected rather than the boiling point of the total hydrocarbon mixture. The boiling point of the key sulfur-containing compounds consisting of dibenzothiophenes, 4-methydibenzothiophenes and 4,6-dimethyldibenzothiophenes are also shown in FIG. 1. The cumulative sulfur specification curves show that the heavy gas oil fraction contains a higher content of heavier sulfur-containing compounds and lower content of lighter sulfur-containing compounds as compared to the light gas oil fraction. For example, it is found that 5370 ppmw of $C_3$-dibenzothiophene, and bulkier molecules such as benzonaphthothiophenes, are present in the heavy gas oil fraction, compared to 1104 ppmw in the light gas oil fraction. In contrast, the light gas oil fraction contains a higher content of light sulfur-containing compounds compared to heavy gas oil. Light sulfur-containing compounds are structurally less bulky than dibenzothiophenes and boil at less than 310° C. Also, twice as much $C_1$ and $C_2$ alkyl-substituted dibenzothiophenes exist in the heavy gas oil fraction as compared to the light gas oil fraction.

Aliphatic sulfur-containing compounds are more easily desulfurized (labile) using conventional hydrodesulphurization methods. However, certain highly branched aliphatic molecules can hinder the sulfur atom removal and are moderately more difficult to desulfurize (refractory) using conventional hydrodesulphurization methods.

Among the sulfur-containing aromatic compounds, thiophenes and benzothiophenes are relatively easy to hydrodesulfurize. The addition of alkyl groups to the ring compounds increases the difficulty of hydrodesulphurization. Dibenzothiophenes resulting from addition of another ring to the benzothiophene family are even more difficult to desulfurize, and the difficulty varies greatly according to their alkyl substitution, with di-beta substituted compounds being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level using current hydrotreating techniques is very costly. When previous regulations permitted sulfur levels up to 500 ppmw, there was little need or incentive to desulfurize beyond the capabilities of conventional hydrodesulphurization processes and hence the refractory sulfur-containing compounds were not targeted; however, in order to meet the more stringent sulfur specifications, these refractory sulfur-containing compounds must be substantially removed from hydrocarbon fuels streams.

Relative reactivities of sulfur-containing compounds based on their first order reaction rates at 250° C. and 300° C. and 40.7 Kg/cm² hydrogen partial pressure over Ni—Mo alumina catalyst, and activation energies, are given in Table 2 (Steher et al., *Fuel Processing Technology*, 79:1-12 (2002)):

TABLE 2

| Name | Dibenzothiophene | 4-methyl-dibenzo-thiophene | 4,6-dimethyl-dibenzo-thiophene |
|---|---|---|---|
| Formula | 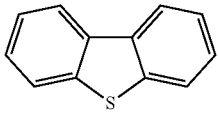 [SMILES: c1ccc2c(c1)sc1ccccc12] | 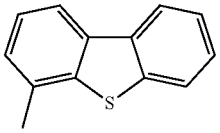 | 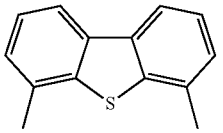 |
| $k_{@250}$, s$^{-1}$ | 57.7 | 10.4 | 1.0 |
| $k_{@300}$, s$^{-1}$ | 7.3 | 2.5 | 1.0 |
| Ea, Kcal/mol | 28.7 | 36.1 | 53.0 |

As is apparent from Table 2, dibenzothiophene is 57 times more reactive than the refractory 4,6-dimethyldibenzothiphene at 250° C. The relative reactivity decreases with increasing operating severity. With a 50° C. temperature increase, the relative reactivity of di-benzothiophene compared to 4,6-dibenzothiophene decreases to 7.3 from 57.7.

The development of non-catalytic processes for desulphurization of petroleum distillate feedstocks has been widely studied, and certain conventional approaches are based on oxidation of sulfur-containing compounds are described, e.g., in U.S. Pat. Nos. 5,910,440; 5,824,207; 5,753,102; 3,341,448 and 2,749,284.

Oxidative desulphurization as applied to middle distillates is attractive for several reasons. First, mild reaction conditions, e.g., temperatures ranging from room temperature up to 200° C. and pressures ranging from 1 up to 15 atmospheres, are normally used, thereby resulting a priori in reasonable investment and operational costs, especially for hydrogen consumption, which is usually expensive. Another attractive aspect is related to the reactivity of high aromatic sulfur-containing species. This is evident since the high electron density at the sulfur atom caused by the attached, electron-rich aromatic rings, further increased by the presence of additional alkyl groups on the aromatic rings, will favor its electrophilic attack as shown in Table 3 (Otsuki, et al., *Energy Fuels,* 14:1232 (2000)). However, the intrinsic reactivity of molecules such as 4,6-DMDBT should be substantially higher than that of DBT, which is much easier to desulfurize by hydrodesulfurization.

ing compounds are converted into oxidized sulfur-containing compounds. After decomposing the residual oxidizing agent, the oxidized sulfur-containing compounds are solvent extracted, resulting in a stream of oxidized sulfur-containing compounds and a reduced-sulfur hydrocarbon oil stream. A

TABLE 3

Electron density of selected sulfur species

| Sulfur compound | Formulas | Electron Density | K (L/(mol · min)) |
|---|---|---|---|
| Thiophenol | (structure) | 5.902 | 0.270 |
| Methyl Phenyl Sulfide | (structure) | 5.915 | 0.295 |
| Diphenyl Sulfide | (structure) | 5.860 | 0.156 |
| 4,6-DMDBT | (structure) | 5.760 | 0.0767 |
| 4-MDBT | (structure) | 5.759 | 0.0627 |
| Dibenzothiophene | (structure) | 5.758 | 0.0460 |
| Benzothiophene | (structure) | 5.739 | 0.00574 |
| 2,5-Dimethylthiophene | (structure) | 5.716 | — |
| 2-methylthiophene | (structure) | 5.706 | — |
| Thiophene | (structure) | 5.696 | — |

Certain existing desulfurization processes incorporate both hydrodesulfurization and oxidative desulfurization. For instance, Cabrera et al., U.S. Pat. No. 6,171,478 describes an integrated process in which the hydrocarbon feedstock is first contacted with a hydrodesulfurization catalyst in a hydrodesulfurization reaction zone to reduce the content of certain sulfur-containing molecules. The resulting hydrocarbon stream is then sent in its entirety to an oxidation zone containing an oxidizing agent where residual sulfur-containfinal step of adsorption is carried out on the latter stream to further reduce the sulfur level.

Kocal, U.S. Pat. No. 6,277,271 also discloses a desulfurization process integrating hydrodesulfurization and oxidative desulfurization. A stream composed of sulfur containing hydrocarbons and a recycle stream containing oxidized sulfur-containing compounds is introduced in a hydrodesulfurization reaction zone and contacted with a hydrodesulfurization catalyst. The resulting hydrocarbon stream containing a reduced sulfur level is contacted in its entirety with an oxidizing agent in an oxidation reaction zone to convert the residual sulfur-containing compounds into oxidized sulfur-containing compounds. The oxidized sulfur-containing compounds are removed in one stream and a second stream of hydrocarbons having a reduced concentration of oxidized sulfur containing compounds is recovered. Like the process in Cabrera et al., the entire hydrodesulfurized effluent is subjected to oxidation in the Kocal process.

Wittenbrink et al., U.S. Pat. No. 6,087,544 discloses a desulfurization process in which a distillate feedstream is first fractionated into a light fraction containing from about 50 to 100 ppm of sulfur, and a heavy fraction. The light fraction is passed to a hydrodesulfurization reaction zone. Part of the desulfurized light fraction is then blended with half of the heavy fraction to produce a low sulfur distillate fuel. However, not all of the distillate feedstream is recovered to obtain the low sulfur distillate fuel product, resulting in a substantial loss of high quality product yield.

Rappas et al., PCT Publication No. WO 02118518 discloses a two-stage desulfurization process located downstream of a hydrotreater. After having been hydrotreated in a hydrodesulfurization reaction zone, the entire distillate feedstream is introduced to an oxidation reaction zone to undergo biphasic oxidation in an aqueous solution of formic acid and hydrogen peroxide. Thiophenic sulfur-containing compounds are converted to corresponding sulfones. Some of the sulfones are retained in the aqueous solution during the oxidation reaction, and must be removed by a subsequent phase separation step. The oil phase containing the remaining sulfones is subjected to a liquid-liquid extraction step. In the process of WO 02118518, like Cabrera et al. and Kocal, the entire hydrodesulfurized effluent is subject to oxidation reactions, in this case biphasic oxidation.

Levy et al., PCT Publication No. WO 031014266 discloses a desulfurization process in which a hydrocarbon stream having sulfur-containing compounds is first introduced to an oxidation reaction zone. Sulfur-containing compounds are oxidized into the corresponding sulfones using an aqueous oxidizing agent. After separating the aqueous oxidizing agent from the hydrocarbon phase, the resulting hydrocarbon stream is passed to a hydrodesulfurization step. In the process of WO 031014266, the entire effluent of the oxidation reaction zone is subject to hydrodesulfurization.

Gong et al., U.S. Pat. No. 6,827,845 discloses a three-step process for removal of sulfur- and nitrogen-containing compounds in a hydrocarbon feedstock. All or a portion of the feedstock is a product of a hydrotreating process. In the first step, the feed is introduced to an oxidation reaction zone containing peracid that is free of catalytically active metals. Next, the oxidized hydrocarbons are separated from the acetic acid phase containing oxidized sulfur and nitrogen compounds. In this reference, a portion of the stream is subject to oxidation. The highest cut point identified is 316° C. In addition, this reference explicitly avoids catalytically active metals in the oxidation zone, which necessitates an increased quantity of peracid and more severe operating conditions. For instance, the $H_2O_2$:S molar ratio in one of the examples is 640, which is extremely high as compared to oxidative desulfurization with a catalytic system.

Gong et al., U.S. Pat. No. 7,252,756 discloses a process for reducing the amount of sulfur- and/or nitrogen-containing compounds for refinery blending of transportation fuels. A hydrocarbon feedstock is contacted with an immiscible phase containing hydrogen peroxide and acetic acid in an oxidation zone. After a gravity phase separation, the oxidized impurities are extracted with aqueous acetic acid. A hydrocarbon stream having reduced impurities is recovered, and the acetic acid phase effluents from the oxidation and the extraction zones are passed to a common separation zone for recovery of the acetic acid. In an optional embodiment, the feedstock to the oxidation process can be a low-boiling component of a hydrotreated distillate. This reference contemplates subjecting the low boiling fraction to the oxidation zone.

M. A. Ledile, et al., *Tetrahedron Lett.*, 10:785 (1976) reported the use of RuOx for oxidation of DBT at 100° C. under 70 bar of air. Sulfur conversion of 97% was obtained after 12 hours.

Recently, the use of cobalt and manganese based catalysts in air based oxidation of DBT type aromatic sulfur compounds into polar sulfones and/or sulfoxides has been described. See, e.g., PCT Application No. WO 2005/116169. A wide number of transition metal oxides, including $MnO_2$, $Cr_2O_3$, $V_2O_5$, NiO, $MoO_3$ and $Co_3O_4$, or transition metal containing compounds such as chromates, vanadates, manganates, rhenates, molybdates and niobates are described, but the more active and selective compounds were manganese and cobalt oxides. It was shown that the manganese or cobalt oxides containing catalysts provided 80% oxidation conversion of DBT at 120° C. One advantage these catalysts is that the treatment of fuel takes place in the liquid phase. The general reaction scheme for the ODS process suggested is as follows: sulfur compound R—S—R' is oxidized to sulfone R—$SO_2$—R', and the latter can decompose with heating, to liberate $SO_2$ and R—R', while leaving behind a useful hydrocarbon compounds that can be utilized. A recommended temperature is from 90° C. to 250° C.

High catalytic activity of manganese and cobalt oxides supported on $Al_2O_3$ in oxidation of sulfur compounds at 130-200° C. and atmospheric pressure has been described by Sampanthar J. T., et al., *Appl. Catal. B: Environm.*, 63(1-2):85-93 (2006). The authors show that, after the subsequent extraction of the oxidation products with a polar solvent, the sulfur content in the fuel decreased to 40-60 ppmw. The thiophenes conversion increased with time and it reached its maximum conversion of 80-90% in 8 h. It was shown that the trisubstituted dibenzothiophene compounds were easier to be oxidized than the monosubstituted dibenzothiophenes. The oxidative reactivity of S-compounds in diesel follows the order: trialkylsubstituted dibenzothiophene > dialkyl-substituted dibenzothiophene > monoalkyl-substituted dibenzothiophene > dibenzothiophene. These results showed that the most refractory sulfur compounds in the diesel hydrodesulfurization were more reactive in the oxidative desulfurization of fuel.

U.S. Pat. No. 5,969,191 describes a catalytic thermochemical process employing a catalyst whose texture is chosen so as to avoid deep oxidation reacting. A key catalytic reaction step in the thermochemical process scheme is the selective catalytic oxidation of organosulfur compounds (e.g., mercaptan) to a valuable chemical intermediate (e.g., $CH_3SH+2O_2 \rightarrow H_2CO+SO_2+H_2O$) over certain supported (mono-layered) metal oxide catalysts. The preferred catalyst employed in this process consists of a specially engineered $V_2O_5/TiO_2$ catalyst that minimizes the adverse effects of heat and mass transfer limitations that can result in the over oxidation of the desired $H_2CO$ to $CO_x$ and $H_2O$.

The process described later by the inventors in PCT Application No. WO 2003/051798 (A1) involves contacting of heterocyclic sulfur compounds in a hydrocarbon stream, e.g., in a petroleum feedstock or petroleum product, in the gas phase in the presence of oxygen with a supported metal oxide catalyst, or with a bulk metal oxide catalyst to convert at least a portion of the heterocyclic sulfur compounds to sulfur dioxide and to useful oxygenated products as well as sulfur-deficient hydrocarbons and separately recovering the oxygenated products separately from a hydrocarbon stream with substantially reduced sulfur. The catalytic metal oxide layer supported by the metal oxide support is based on a metal selected from the group consisting of Ti, Zr, Mo, Re, V, Cr, W, Mn, Nb, Ta, and mixtures thereof. Generally, a support of titania, zirconia, ceria, niobia, tin oxide or a mixture of two or more of these is preferred. Bulk metal oxide catalysts based on molybdenum, chromium and vanadium can be also used. Sulfur content in fuel could be less than about 30-100 ppmw. The optimum space velocity likely will be maintained below 4800 V/V/hr and the temperature will be 50-200° C.

The vapor-phase oxidative desulfurization of various sulfur compounds (such as: COS, or $CS_2$, $CH_3SH$, $CH_3SCH_3$, $CH_3SSCH_3$, thiophene and 2,5-dimethylthiophene) by use of sulfur-tolerant $V_2O_5$-containing catalysts on different supports has been taught by Choi, S.; et al., Preprints of Symposia—American Chemical Society, Division of Fuel Chemistry, 47(1):138-139 (2002) 138-139 and Choi S., et al., Preprints of Symposia—American Chemical Society, Division of Fuel Chemistry, 49(2):514-515 (2004). In these papers, the feed gas contained 1000 ppmw of COS, or CS2, $CH_3SH$, $CH_3SCH_3$, $CH_3SSCH_3$, thiophene and 2,5-dimethylthiophene, 18% $O_2$ in He balance. The formed products (formalin, CO, $H_2$, maleic anhydride and $SO_2$) were monitored by temperature programmed surface reaction mass spectrometry. It was shown that the turnover frequency for COS and $CS_2$ oxidation varied by about one order of magnitude depending on the support, in the order $CeO_2>ZrO_2>TiO_2>Nb_2O_5>Al_2O_3—SiO_2$.

A common catalyst for oxidative desulfurization is activated carbon (Yu et al., Energy & Fuels, 19(2):447-452 (2005), Wu et al., Energy and Fuels, 19(5):1774-1782 (2005)). The application of this method allows removal of hydrogen sulfide from gaseous fuels at 150° C. by oxidation with air (Wu et al., Energy and Fuels, 19(5):1774-1782 (2005) and also sulfur removal from diesel fuels using hydrogen peroxide (Yu et al., Energy & Fuels, 19(2):447-452 (2005)). The higher adsorption capacity of the carbon, the higher its activity in the oxidation of dibenzothiophene.

The prior art evidences different ways to approach the problem of desulfurizing fuels.

U.S. Pat. No. 7,749,376 to Turbeville, et al., describes catalytic processes whereby sulfur-containing compounds are adsorbed onto a catalytic bed. The process is carried out with liquid hydrocarbons, at low temperatures. It is a non-oxidative process, which uses a catalyst with a hydrotalcite structure of the form $(Cu,Zn)_6Al_2(OH)_{16}CO_3*4H_2O_2$.

U.S. Pat. No. 4,596,782 to Courty, et al., teaches a catalytic process for producing ethanol and methanol over a Cu—Zn—Al catalyst. The catalyst requires activation via, e.g., reducing conditions and a substance such as $H_2$, CO, or an alcohol, resulting in the reduction of copper oxide to metal copper particles, which are active in the well known Fischer-Tropsch process.

U.S. Pat. No. 3,945,914 to Yoo, et al., describes a catalytic process for removing sulfur compounds from liquid hydrocarbons. The catalyst employed differs markedly from the invention described herein.

U.S. Pat. No. 2,640,010 to Hoover, et al., describes a process for removing sulfur-containing compounds from gaseous phase hydrocarbons; however, the catalyst is markedly different from the present invention.

None of these references teach or suggest the catalytic composition of the invention, its use in removal of sulfur containing compounds from gaseous phase hydrocarbons in either an oxidative process or an adsorptive process, or the processes by which these catalysts are made.

Therefore, a need exists for an efficient and effective process and apparatus for desulfurization of hydrocarbon fuels to an ultra-low sulfur level.

Accordingly, it is an object of the present invention to desulfurize a hydrocarbon fuel stream containing different classes of sulfur-containing compounds having different reactivities, utilizing reactions separately directed to labile and refractory classes of sulfur-containing compounds.

It is a further object of the present invention to produce hydrocarbon fuels having an ultra-low sulfur level by gas phase oxidative and/or adsorptive desulphurization of refractory organosulfur compounds.

As used herein in relation to the apparatus and process of the present invention, the term "labile organosulfur compounds" means organosulfur compounds that can be easily desulfurized under relatively mild hydrodesulfurization pressure and temperature conditions, and the term "refractory organosulfur compounds" means organosulfur compounds that are relatively more difficult to desulfurize under mild hydrodesulfurization conditions.

The desulphurization of the hydrocarbon full stream may occur via one of two reaction routes. In a first route, the so-called "oxidative process," the sulfur compounds are oxidized, wherein at least a portion of them are oxidized to $SO_2$. In a second route, the so-called "adsorptive process," the compounds are converted to one or more of sulfates, sulfites, and sulfides. Which route is chosen depends upon reaction conditions as well as the type and amount of sulfur compounds in the hydrocarbon fuel stream. When the adsorptive route is used, it is necessary to regenerate the catalysts at some point, so as to remove the sulfur compounds adsorbed therein.

How the various aspects of the invention are achieved will be seen in the detailed description which follows.

DETAILED DESCRIPTION OF PREFERRED EMBODIMENTS

Example 1

$Cu(NO_3)_2$, (0.2 moles), $Zn(NO_3)_2$ (0.07 moles), and $Al(NO_3)_3$ (0.235 moles), were dissolved in 500 ml of distilled water, to form what shall be referred to as "solution A" hereafter. The pH of the solution was 2.3.

Similarly, 19.08 g of $Na_2CO_3$, (0.18 moles), and 36 g of NaOH (0.9 moles), were dissolved in 600 ml of distilled water, to produce "solution B," which had a pH of 13.7.

Solution A was heated to 65° C. and solution B was added to solution A, at a rate of about 5 ml/minute, with constant agitation, until all of solution B was added. The resulting mixture had a pH of 11.0. A precipitate resulted which was aged, for 6 hours, at 65° C., pH 11. The solution was cooled to room temperature and filtered with a Buchner funnel.

Precipitate was washed with distilled water. Analysis showed that nearly all of the Cu, Zn, and Al precipitated out of the solution (99%).

The precipitate was then dried at room temperature, for 12 hours, at 110° C. The dried material was dark brown in color. Following drying, it was calcined, at 500° C., for 2 hours.

The calcined product contained 36 wt % elemental Cu, 12.1 wt % elemental Zn, 14.2 wt % elemental Al, and 0.02 wt % elemental Na. (In all of the examples which follow, weight percent is given in terms of the pure element, rather than the oxide.)

Figure 1:
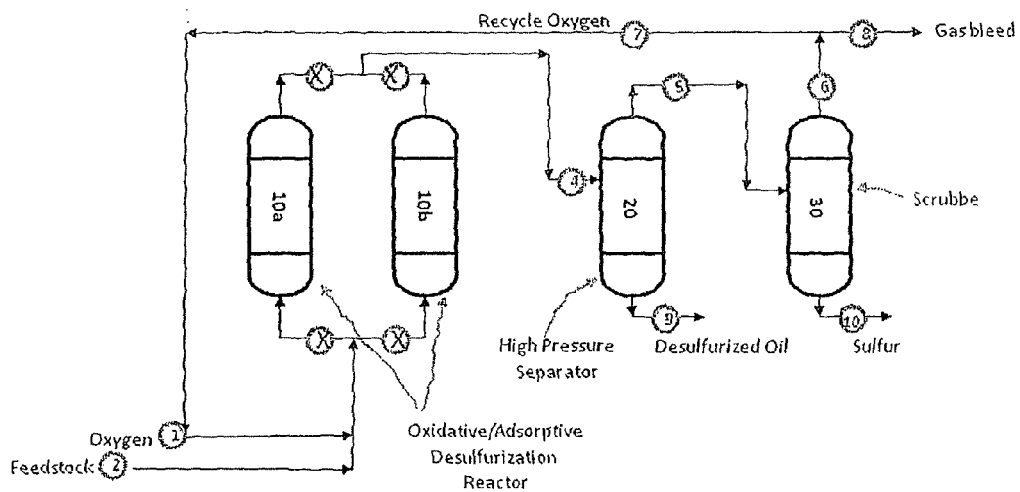
FIG. 1 shows one reactor system useful in the practice of the invention.

Referring now to FIG. 1, alternate embodiments of the invention may be seen therein. In either embodiment a feedstock stream "1" and a feed of an oxidizing agent "2" are combined, one of reactors 10a or 10b, which are, respectively, oxidation and adsorption reactors. When the stream is sent to reactor 10a for the oxidation reaction to take place, gas stream "4" is removed and transferred to high pressure separation reactor 20, where $C_1$-$C_4$ gases, oxygen, any $SO_2$, $H_2S$ and COS are separated, as is sulfur free steam "9," which is removed from the reactor.

The stream containing the other materials "5," is then sent to a scrubber reactor "30," where $SO_2$ and $H_2S$ are removed, with the remaining, cleaned gas sent for oxidation, while sulfur containing materials are treated to obtain pure sulfur.

If materials are sent to adsorptive reactor 10b, as noted supra, any of sulfites, sulfates, and sulfides deposit on the catalyst, and the thus treated gas undergoes the same processes that the gas resulting from the oxidation reaction does.

The atomic ratio of Cu:Zn:Al was 3:1:2.8. The product had a specific surface area of 94 $m^2/g$, pore volume of 0.24 $cm^3/g$, and an average pore diameter of 9.5 nm. It exhibited highly dispersed CuO and ZnO, with an X-ray amorphous oxide phase. "X-ray amorphous oxide phase" as used herein means that, when observed via high resolution transmission electron microscopy ("HRTEM"), crystalline particles ranging from 2-10 nm, and usually 2-5 nm, were observed. Lattice parameters were very close to those of spinels, hence the chemical composition, deduced from EDX data, is $Cu_{0.3}Zn_{0.7}Al_2O_4$.

Example 2

A 500 ml sample of solution A was prepared as was 600 ml of a new solution B, which contained 1 mole of $(NH_4)_2CO_3$, at pH 8.7.

Solution A was heated to 65° C., and solution B was added gradually to solution A, with constant agitation. The combined solution had a pH of 7.6.

Following combination of solutions A and B, a precipitate formed, which was aged for 1 hour at 65° C. The precipitate was filtered in the same way the precipitate of Example 1 was filtered, and was then washed with room temperature distilled water. Analysis showed the precipitate contained about 99% of the Zn and Al from the solution and 80-85% of the Cu passed to the precipitate.

Precipitate was dried, as in Example 1, supra, and then calcined at 500° C. for 4 hours.

The resulting compound was 26.3 wt % Cu, 15.8 wt % Zn, 22.3 wt % Al, and the atomic ratio of Cu:Zn:Al was 1.7:1:3.5. The compound had a specific surface area of 82 $m^2/g$, pore volume of 0.29 $cm^3/g$, and an average pore diameter of 12 nm. It exhibited an X-ray amorphous oxide phase ($Cu_{0.45}Zn_{0.55}Al_2O_4$), and highly dispersed CuO, which contained less than 50% of the total copper.

Example 3

As in the first 2 examples, a sample of solution A was prepared. In this Example, "solution B" was prepared by combining 47.7 g (0.45 moles) of $Na_2CO_3$, and 18 g (0.45 moles) of NaOH, in 600 ml of distilled water, to produce a solution with a pH of 13.4.

Solution A was heated to 50° C., and solution B was added gradually, at a rate of 4 ml/min, with constant agitation. The resulting pH was 10.

A precipitate formed and was aged for 2 hours at 50° C., pH 8.5, during which the solution was filtered. Following washing, the precipitate was analyzed and found to contain about 99% of the Cu, Zn, and Al of the amount initially contained in the solution, but it also contained a high amount of Na.

Following drying at room temperature for 12 hours, and then for 12 hours at 110° C., the dark brown precipitate was calcined at 500° C., for 2 hours.

The resulting product contained 40.5 wt % Cu, 13.3 wt % Zn, 13.8 wt % Al, and 0.47 wt % Na. The atomic ratio of the components Cu:Zn:Al was 3.1:1:2.5. The composition had a specific surface area of 62 $m^2/g$, a pore volume of 0.15 $cm^3/g$, and an average pore diameter of 8.7 nm. As with the preceding examples, the composition exhibited an X-ray amorphous oxide phase ($Cu_{0.2}Zn_{0.8}Al_2O_4$), and a highly dispersed crystal phase which contained most of the Cu.

Example 4

The steps of Example 1 were followed, but the precipitate was filtered hot, and without aging. The calcined composition contained 40.2 wt % Cu, 9.7 wt % Zn, 17.2 wt % Al, and 0.22 wt % Na. The atomic ratio of Cu:Zn:Al was 4.2:1:4.3. The specific surface area was 75 $m^2/g$, and the pore volume was 0.29 $cm^3/g$. Average pore diameter was 12.5 nm. The phase composition was highly dispersed, crystalline phases of CuO, ZnO, and $Al_2O_3$.

Example 5

In this example, Example 2 was followed except $5.5 \times 10^{-4}$ moles of cerium nitrate were added to solution A. After the precipitate was formed, it was aged for 6 hours at 55° C. Analysis of the calcined composition showed 20.9 wt % Cu, 17.1 wt % Zn, 23.9 wt % Al, and 0.5 wt % Ce. The atomic ratio of Cu:Zn:Ce:Al was 3.0:1:0.01:3.8. The composition had a specific area of 83 $m^2/g$, a pore volume of 0.20 $cm^3/g$, and an average pore diameter of 10.0 nm. It exhibited an X-ray amorphous oxide phase with a composition of $Cu_{0.5}Zn_{0.5}Al_2O_4$ and a highly dispersed crystalline phase of CuO, which contained less than 60% of the Cu, and also a cerium phase, with particles not exceeding 5 nm in diameter. While the amounts of oxides are not provided here or hereafter, the method set forth in Example 1, supra, can be followed to secure precise amounts thereof.

Example 6

This example parallels Example 5, except the amount of cerium nitrate was increased to $9.5 \times 10^{-3}$ moles. Precipitation formation and filtration were carried out at 65° C., for 6 hours.

The resulting calcined composition had the following composition: Cu: 20.2 wt %, Zn: 15.1 wt %, Al: 20.2 wt %, Ce: 8.5 wt %. Atomic ratios of Cu:Zn:Ce:Al were 1:35:1: 0.25:3.2. The specific surface area was 125 m$^2$/g, with a pore volume of 0.3 cm$^3$/g. Average pore diameter was 8.0 nm. As with the other compositions, it exhibited an X-ray amorphous oxide phase and a formula of Cu$_{0.5}$Zn$_{0.5}$Al$_2$O$_4$. It also exhibited a cerium phase with particles not greater than 10 nm in diameter.

Example 7

In this example, "solution A" contained 0.05 moles Cu nitrate, 0.07 moles Zn nitrate, and 0.13 moles Al nitrate, in 500 ml of distilled water, at a pH of 2.6.

Solution B contained 53.0 g Na$_2$CO$_3$ (0.5 moles), and 18 g NaOH (0.45 moles), in 600 ml of water, at a pH of 13.7. The solutions were mixed and the resulting precipitate separated, as in Example 1. The calcined composition contained 10 wt % Cu, 20.0 wt % Zn, 21.3 wt % Al, and 0.65 wt % Na. The atomic ratio of Cu:Zn:Al was 0.5:1:2.5, with a specific surface area of 112 m$^2$/g, a pore volume of 0.30 cm$^3$/g, and average pore diameter of 10.8 nm. The composition exhibited formula Cu$_{0.33}$Zn$_{0.67}$Al$_2$O$_4$, and the composition also contained a highly dispersed crystalline ZnO phase.

Example 8

In this example, solutions A and B were prepared in the same manner as the solutions of Example 2.

Aging of the precipitate took place over 6 hours, at 65° C., pH 6.5, rather than 1 hour, as in Example 2.

The resulting calcined product contained 10.0 wt % Cu, 12.1 wt % Zn, 33.8 wt % Al, and 0.05 wt % Na. The atomic ratio for Cu:Zn:Al was 0.84:1:6.7. The specific surface area was 100 m$^2$/g, the pore volume 0.35 cm$^3$/g, and the average pore diameter was 11.0 nm. The composition exhibited the same X-ray amorphous oxide phase formula Cu$_{0.4}$Zn$_{0.6}$Al$_2$O$_4$, and there was a γ-Al$_2$O$_3$ phase as well.

Example 9

In this example, Solution A contained 0.05 moles Cu nitrate, 0.02 moles Zn nitrate, and 0.45 moles Al nitrate, dissolved in 500 ml distilled water, and have a pH of 2.25.

Solution B contained 53.0 g (0.5 m) (NH$_4$)$_2$CO$_3$ dissolved in 600 ml of distilled water. The pH was 8.0.

Precipitation, and separation of the precipitate, took place over 4 hours, at 65° C., pH 6.5, to yield a composition containing 13.0 wt % Cu, 4.2 wt % Zn, and 36.5 wt % Al. The atomic ratio for Cu:Zn:Al was 3.1:1:21. The specific surface area was 150 m$^2$/g, with a pore volume of 0.45 cm$^3$/g, with an average pore volume of 9.5 nm. The observed formula of the composition was ZnAl$_2$O$_4$ and Al$_2$O$_3$ modified by Cu in the form of CuO.

Example 10

In this example, solution A contained 0.25 m Cu, 0.07 moles Zn, and 0.20 moles Al in their nitrate form, dissolved in 500 ml of distilled water, at pH 2.3. Solution B contained 53.0 g Na$_2$CO$_3$ (0.5 m), and 12 g NaOH (0.3 m), in 600 ml distilled water, at pH 13.3.

Precipitation conditions were those of Example 1, supra, which did not permit total precipitation of Al. In fact, while the precipitation of Cu and Zn was 99% that of Al did not exceed 80%. The resulting composition contained 50 wt % Cu, 25.2 wt % Zn, 7.4 wt % Al, and 0.85 wt % Na. The atomic ratio of Cu:Zn:Al was 2.0:1.0:0.7. The specific surface area was 50 m$^2$/g, the pore volume was 0.20 cm$^3$/g, and the average pore diameter was 15.2 nm. The formula of the composition was Cu$_{0.33}$Zn$_{0.67}$Al$_2$O$_4$, with highly dispersed crystalline CuO and ZnO phases.

Example 11

In this final synthesis example, solution A did not contain Al nitrate, but only 0.04 moles Cu, 0.02 moles Zn and 0.14 moles Ce in nitrate form, dissolved in 500 ml of distilled water, at pH 4.2.

Solution B contained 15.0 g (NH$_4$)$_2$CO$_3$ and 18.0 g NH$_4$HCO$_3$ in 600 ml distilled water, at a pH of 8.0.

Following calcination, the composition contained 6.5 wt % Cu, 3.85 wt % Zn, and 78 wt % Ce. The atomic ratio of components Cu:Zn:Ce was 1.7:1:9.5, and the specific surface area was 85 m$^2$/g, with pore volume 0.23 cm$^3$/g and average pore diameter of 10.9 nm. The observed composition by XRD was a highly dispersed crystalline CeO$_2$ phase. Crystalline phases of Cu and Zn were not detected.

Example 12

The catalysts prepared in Examples 1-11, supra, were then tested for their ability to oxidatively desulfurize fuel oil containing sulfur-containing compounds. Fuels were prepared which contained thiophene, DBT (dibenzothiophene), and 4,6 DMDBT. The fuels were heated to gaseous state, and passed over the catalytic compounds. In the Tables which follow, the formulation of the catalyst ("Cu—Zn—Al," "Cu—Zn—Al—Ce," or "Cu—Zn—Ce") is followed by "(1)" or "(2)". This refers to the nature of "solution B" in Examples 1-11, with "(1)" referring to a Na containing solution and "(2)" to an ammonium containing solution, as per Examples 1 and 2. The final number indicates which example was used to produce the catalyst.

Example 13

Thiophene, DBT, and a diesel fuel with the following properties were oxidized: T$_{50}$: 264; T$_{95}$: 351; density at 20° C., in Kg/l: 0.841, sulfur, in wt %: 1.93, was oxidized with the catalyst of Example 1. Similarly, 4,6 DMDBT was oxidized with the catalysts of Examples 1, 2, and 5. Tables 4, 5, and 6 present these results:

TABLE 4

| Oxidation of thiophene in octane solution | | | | | | | |
| --- | --- | --- | --- | --- | --- | --- | --- |
| Catalyst | T ° C. | S Content ppmw | O$_2$/S | GHSV h$^{-1}$ | WHSV h$^{-1}$ | S Removal W % | HC Conversion W % |
| Cu—Zn—Al (1)-1 | 329 | 1000 | 59 | 22500 | 28 | 90 | 1.2 |

TABLE 5

Oxidation of DBT in toluene solution

| Catalyst | T °C. | S Content ppmw | $O_2$/S | GHSV $h^{-1}$ | WHSV $h^{-1}$ | S removal W % | HC Conversion W % |
|---|---|---|---|---|---|---|---|
| Cu—Zn—Al (1)-1 | 300 | 800 | 80 | 2600 | 6 | 87 | 2.1 |
| Cu—Zn—Al (2)-2 | 360 | 900 | 139 | 2900 | 6 | 53 | 3.5 |
| Cu—Zn—Al (1)-3 | 385 | 900 | 120 | 3700 | 8 | 69 | 3.9 |
| Cu—Zn—Al(1)-4 | 370 | 900 | 95 | 3200 | 8 | 31 | 2.9 |
| Cu—Zn—Al—Ce(2)-5 | 350 | 900 | 140 | 2900 | 6 | 55 | 3.1 |
| Cu—Zn—Al—Ce(2)-6 | 400 | 900 | 140 | 3100 | 6 | 26 | 3.0 |
| Cu—Zn—Al (1)-7 | 350 | 1100 | 100 | 1700 | 6 | 33 | 1.3 |
| Cu—Zn—Al (1)-8 | 340 | 1000 | 120 | 3900 | 6 | 48 | 3.7 |
| Cu—Zn—Al (1)-9 | 400 | 1500 | 40 | 27000 | 28 | 66 | 1.7 |
| Cu—Zn—Al (1)-10 | 340 | 1100 | 60 | 1500 | 6 | 24 | 3.3 |
| Cu—Zn—Ce(2)-11 | 310 | 800 | 70 | 2600 | 6 | 22 | 1.9 |
| Cu—Zn—Ce(2)-11 | 330 | 4100 | 30 | 4100 | 6 | 14 | 4.2 |

TABLE 6

Oxidation of 4,6-DMDBT in toluene solution

| Catalyst | T °C. | S Content ppmw | $O_2$/S | GHSV $h^{-1}$ | WHSV $h^{-1}$ | S Removal % | HC Conversion % |
|---|---|---|---|---|---|---|---|
| Cu—Zn—Al (1)-1 | 312 | 900 | 140 | 2085 | 6 | 81 | 3.8 |
| Cu—Zn—Al (2)-2 | 350 | 1000 | 140 | 2100 | 6 | 78 | 3.5 |
| Cu—Zn—Al—Ce(2)-5 | 350 | 1000 | 140 | 2100 | 6 | 37 | 4.1 |

About 0.16 vol. % of $H_2S$, 0.118 vol. % of $SO_2$, and 5 vol. % of $CO_2$ were found at the reactor outlet upon oxidation of the diesel fuel.

In these tables, "GHSV" refers to the "gas volume rate" (in liters/hour), "WHSV" means "weight hourly space velocity: feed rate (Kg/hours) over the weight of the catalyst. "$O_2$/S" refers to the rate at which oxygen was introduced to the material being tested. "S" and "HC" refer to "sulfur" and "hydrocarbon," respectively.

Example 14

This, and the following examples, summarize experiments which show that sulfur can be removed from feedstreams via an adsorptive process.

As with the prior examples, model hydrocarbon fuels containing thiophene, DBT, or 4,6DMDBT (both were dissolved in toluene at 0.09-0.5 wt. % S) were treated, using the catalysts of the examples, at various conditions, as set forth in Tables 7, 8, and 9 which follow:

TABLE 7

Adsorptive/oxidative desulfurization of thiophene in hydrocarbon

| Catalyst | T, °C. | S content, wt. % | $O_2$/S | GHSV $h^{-1}$ | WHSV, $h^{-1}$ | Time, h | S conversion calculated from gas-phase products, % | S conversion calculated from analysis of liquid products, % | HC conversion, % |
|---|---|---|---|---|---|---|---|---|---|
| Cu—Zn—Al (1) | 317 | 0.1 | 59 | 20730 | 28 | 1 | 46 | 82 | 0.5 |
|  | 317 | 0.1 | 59 | 20730 | 28 | 6 | 40 | 40 | 1.5 |
| Cu—Zn—Al (2) | 300 | 0.5 | 12 | 9600 | 28 | 1 | 30 | 45 | 1.0 |
|  | 300 | 0.5 | 12 | 9600 | 28 | 6 | 24 | 16 | 3.1 |

*The hydrocarbon was octane for catalyst Cu—Zn—Al(1) and toluene for Cu—Zn—Al(2).

TABLE 8

Adsorptive/oxidative desulfurization of DBT in toluene

| Catalyst | T, °C. | S content, wt. % | $O_2$/S | GHSV, $h^{-1}$ | WHSV, $h^{-1}$ | Time, h | S conversion calculated from gas-phase products, % | S conversion calculated from analysis of liquid products, % | HC conversion, % |
|---|---|---|---|---|---|---|---|---|---|
| Cu—Zn—Al (1) | 300 | 0.16 | 50 | 2100 | 6 | 1 | 13 | 80 | 1.3 |
| Cu—Zn—Al (2) | 300 | 0.08 | 80 | 2600 | 6 | 1 | 18 | 87 | 2.1 |
|  | 300 | 0.08 | 80 | 2600 | 6 | 6 | 55 | 49 | 3.1 |
| Cu—Zn—Ce—Al (3) | 400 | 0.09 | 140 | 3100 | 6 | 1 | 15 | 40 | 3.0 |
|  | 400 | 0.09 | 140 | 3100 | 6 | 6 | 29 | 26 | 3.0 |
| Cu—Zn—Al (1) | 300 | 0.46 | 20 | 2700 | 6 | 1 | 13 | 60 | 1.0 |
|  | 300 | 0.43 | 20 | 3260 | 6 | 4 | 38 | 47 | 2.0 |
|  | 300 | 0.46 | 20 | 2100 | 6 | 8 | 17 | 23 | 2.7 |

TABLE 9

Adsorptive/oxidative desulfurization of 4,6-DMDBT in toluene

| Catalyst | T, °C. | S content, wt. % | $O_2$/S, | GHSV, $h^{-1}$ | WHSV, $h^{-1}$ | Time, h | S conversion calculated from gas-phase products, % | S conversion calculated from analysis of liquid products, % | HC conversion, % |
|---|---|---|---|---|---|---|---|---|---|
| Cu—Zn—Al (1) | 370 | 0.09 | 138 | 3000 | 6 | 2 | 28 | 70 | 2.8 |
| Cu—Zn—Al (1) | 310 | 0.09 | 138 | 2084 | 6 | 2 | 36 | 81 | 3.8 |
|  | 310 | 0.09 | 138 | 2084 | 6 | 6 | 32 | 32 | 3.4 |
| Cu—Zn—Al (1) | 350 | 0.09 | 138 | 2084 | 6 | 4 | 52 | 78 | 3.6 |
|  | 350 | 0.09 | 138 | 2084 | 6 | 8 | 49 | 47 | 3.6 |

Analysis showed that the sulfur removed in gas and liquid phases, differed. With respect to the gas phase, the prevailing sulfur containing compound was $SO_2$, in amounts which varied from 0.035 vol. % to 0.42 vol. %. This value depended upon, inter alia, the sulfur content of the feedstream, the $O_2$/S ratio, the GHSV value, and the length of the reaction. When lower values were seen in the gas phase, this was due to deposit of sulfites, sulfides, and sulfates in the catalysts. Indeed, examination of spent catalysts, via FTIR, showed superficial $SO_4^{2-}$ groups, including $CuSO_4$ and $ZnSO_4$. Bulk sulfates were not observed. Tables 7, 8, and 9 summarize these data.

Example 15

Figure 2:
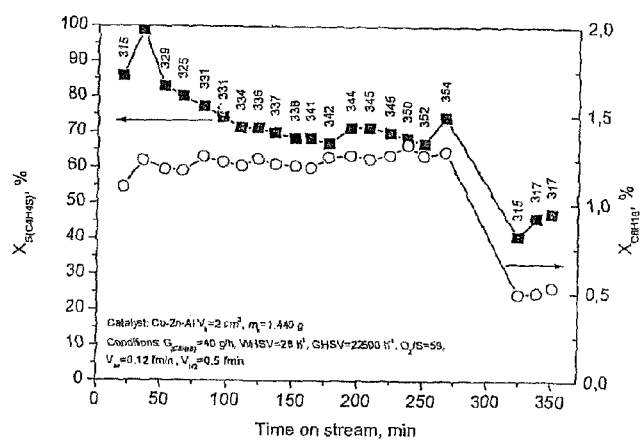
FIG. 2 depicts graphically, the loss in activity of the catalysts of the invention due to adsorption of sulfur containing compounds thereon.

Over the course of the experiments described in Example 14, supra, catalytic activity decreased markedly. FIG. 2 presents exemplary data for a feedstream of thiophene in octane at a sulfur concentration of 0.14 wt. %, with sulfur being converted to gaseous $SO_2$ and COS. The reaction took place over the time period indicated, and temperatures of the reaction (in ° C.) are given.

As can be seen from the open circles, catalytic activity decreased over time after 5-6 hours it was necessary to reactivate the catalysts. The manner in which reactivation was accomplished is set forth in Examples 19 et seq.

Example 16

Further experiments were carried out to study adsorption and oxidation in accordance with the invention.

A commercially available diesel fuel marketed for off road applications was analyzed for sulfur content, using standard techniques. The total sulfur content was determined to be 0.042 wt. %, distributed, for the most part, amongst dibenzothiophene, 4-methyldibenzothiophene, 4,6-dimethyldibenzothiophene, acenaphthol[1,2-b]thiophene, 1,4,7,-trimethyldibenzothiophene, and 4-ethyl-6-bethyldibenzothiophene.

Three different experiments using different parameters, were carried out. The results are summarized here:

TABLE 10

Adsorptive/oxidative desulfurization of diesel fuel for off-road applications

| Catalyst | T, °C. | S content, wt. % | $O_2$/S | GHSV, $h^{-1}$ | WHSV, $h^{-1}$ | Time, h | S conversion calculated from gas-phase products, %* | S conversion calculated from analysis of liquid products, %** | HC conversion, % |
|---|---|---|---|---|---|---|---|---|---|
| Cu—Zn—Al (1) | 400 | 0.042 | 300 | 2800 | 6 | 4 | 0 | 20 | 1.6 |
| Cu—Zn—Al (1) | 410 | 0.042 | 400 | 3400 | 6 | 4 | 0 | 23 | 2.5 |
| Cu—Zn—Al (1) | 470 | 0.042 | 500 | 4000 | 6 | 4 | 0 | 21 | 3.9 |

*Sulfur-containing products (which can be H2S and SO2) were not observed in gas-phase by GC analysis;
**Sulfur conversion in liquid products was calculated from sulfur content measured by a Sulfur Analyzer Horiba SLFA-20 (accuracy ±15 ppmw) and by ASE-2 X-ray Fluorescence Energy Dispersive (FED) Sulfur Analyzer.

Gaseous sulfur containing compounds (i.e., $SO_2$ and $H_2S$) were not found, which indicates the sulfur compounds must have been adsorbed. Indeed, analysis of liquid products showed DBT, 4-MDBT, and 4,6-DMDBT. Table 11, which follows, summarizes the data on these compounds. No oxygenated products were found.

It should be noted that the reduction of content of individual sulfur compounds, was confirmed via independent, GC-AED analysis.

TABLE 11

The content of DBT, 4-MDBT and 4,6-DMBT in the diesel fuel for off-road application before and after the adsorptive/oxidative desulfurization test

| Compound | Content in the initial diesel fuel, ppm | Content in the diesel fuel after the desulfurization test, ppm | Conversion of sulfur compound, % |
|---|---|---|---|
| DBT | 25 | 17 | 32 |
| 4-DMBT | 22 | 17 | 23 |
| 4,6-DMDBT | 41 | 26 | 37 |

*Sulfur conversion in liquid product was calculated from sulfur content measured by GC-AED analysis.

Example 17

In a further set of experiments, a straight run diesel fuel was used, which contained 1.92 wt. % sulfur. Analysis of the fuel sample showed that it contained more light weight sulfur compounds (defined as having retention time less than 67, which is the retention time of DBT), and which are probably derivatives of benzothiophene. Other sulfur containing compounds in the fuel oil are: dibenzothiophene, 4-methyldibenzothiophene, 4,6-dimethyldibenzothiophene, as well as minor amounts of other alkyl substituted dibenzothiophenes.

The sample was treated, in the same way all other samples were treated. The results are presented in Table 12.

TABLE 12

Adsorptive/oxidative desulfurization of straight-run diesel fraction 180-360° C.

| Catalyst | T °C. | S content wt. % | $O_2$/S | GHSV $h^{-1}$ | WHSV $h^{-1}$ | Time h | S conversion in gas-phase product % | S conversion in liquid product* % | HC Conversion % |
|---|---|---|---|---|---|---|---|---|---|
| Cu—Zn—Al (1) | 470 | 1.92 | 25 | 7900 | 6 | 6 | 17 | 17 | 7.3 |
| Cu—Zn—Al (1) | 600 | 1.92 | 30 | 10000 | 6 | 6 | 16 | 40 | 10.0 |
| Cu—Zn—Al (1) | 580 | 1.92 | 30 | 20000 (with $N_2$) | 6 | 6 | 40 | 41 | 8.0 |

*Sulfur conversion in liquid product was calculated from sulfur content measured by ASE-2 X-ray Fluorescence Energy Dispersive (FED) Sulfur Analyzer.

About 0.065 vol. % of $SO_2$, and 6 vol. % of $CO_2$ were monitored, at the outset of the reactor. When sulfur content in the liquid products was calculated, they were higher than those calculated when analyzing gas phase products. This is believed to be due to partial adsorption of sulfite and sulfate species on the surfaces of the catalysts, and also the presence of $Cu_2S$ (XRD data showed $Cu_{1.96}S$, and $Cu_7S_4$). Total sulfur content on spent catalysts, according to CHNS analysis, was 6-10 wt. %. The adsorbed compounds could be removed by increasing GHSW, via adding inert gas to the flow whereby $H_2S$ and $CO_2$ were produced. Concentrations reached 0.16 and 0.118 vol. %, respectively.

The samples of this example and Example 15 were compared via GC-AED analysis. It found that the straight run diesel fuel of the example contained anywhere from 20-40% less sulfur compounds than the initial fuel sample. Sulfur conversion data bear this out.

Results of the comparison are summarized in Table 13.

TABLE 13

The content of DBT, 4-MDBT and 4,6-DMBT in the straight-run diesel fuel before and after the adsorptive/oxidative desulfurization test

| Compound | Content in the initial diesel fuel, ppm | Content in the diesel fuel after the test, ppm | Conversion of sulfur compound, % |
|---|---|---|---|
| DBT | 183 | 121 | 34 |
| 4-DMBT | 206 | 142 | 31 |
| 4,6-DMDBT | 516 | 363 | 30 |

*Sulfur conversion in liquid product was calculated from sulfur content measured by GC-AED analysis.

Example 18

The preceding examples demonstrated that the catalysts of the invention can be used in both oxidative and adsorptive removal of sulfur from feedstreams, such as hydrocarbon fuels. Experiments were carried out to determine if one or more factors were important in determining which mechanism predominated in these systems.

Three tables follow, which summarize these results. In Table 14, a feedstock of dibenzothiophene in toluene was used, at various parameters. The results indicated that, when the other conditions are the same or similar, low GHSV favors adsorption as does a high $O_2/S$ ratio. "Low GHSV" as used herein refers to a GHSV less than 3000 $h^{-1}$, and "high $O_2$/ratio" means more than 30.

In addition to the data presented in Table 14, a sample of diesel fuel with a sulfur content of 1.93 wt. % was tested, where the only variable was GHSV. These data are presented in Table 15.

The sulfur type also played an important role in adsorption. Table 15 summarizes the results from 4,6-DMDBT (line #2) and DBT (line #1) desulfurization. As seen, 4,6-DMDBT has a higher tendency to be adsorbed than DBT for the same operating conditions. This is a result of higher ability of 4,6-DMDBT to be oxidized into sulfates and sulfites as compared to DBT, due to the higher electron density of 4,6-DMDBT.

The adsorption route involves the formation of sulfates and sulfites that need the addition of more oxygen as compared to the reaction route leading to SOx. This can be done by either reducing the contact time of oxygen or by increasing the oxygen concentration.

TABLE 14

| Catalyst | T ° C. | S (wt %) | $O_2$/S | GHSV ($h^{-1}$) | WHSV ($h^{-1}$) | S removal, W % Gas Analysis | S removal, W % Liquid Analysis |
|---|---|---|---|---|---|---|---|
| Cu—Zn—Al (1) | 280 | 0.15 | 38 | 27430 | 28 | 52 | 39 |
| Cu—Zn—Al (1) | 300 | 0.16 | 50 | 2100 | 6 | 13 | 80 |
| Cu—Zn—Al (1) | 300 | 0.43 | 30 | 2700 | 6 | 13 | 60 |
| Cu—Zn—Al (1) | 326 | 0.46 | 30 | 4160 | 6 | 55 | 60 |
| Cu—Zn—Al (1) | 300 | 0.43 | 50 | 3800 | 6 | 20 | 77 |

TABLE 15

| Catalyst | T ° C. | S, W % | O2/S | GHSV, $h^{-1}$ | WHSV, $h^{-1}$ | S removal, W % Gas Analysis | S removal, W % Liquid Analysis |
|---|---|---|---|---|---|---|---|
| Cu—Zn—Al (1) | 370 | 0.09 | 138 | 3000 | 6 | 39 | 36 |
| Cu—Zn—Al (1) | 370 | 0.09 | 138 | 3000 | 6 | 28 | 70 |

The same trend was observed when a diesel fraction containing 1.93 W % sulfur was desulfurized. The results are shown in Table 16. As seen, a lower GHSV leads to more adsorption than reaction into SOx.

TABLE 16

| Catalyst | T ° C. | $O_2$/S | GHSV, $h^{-1}$ | WHSV, $h^{-1}$ | S removal, W % Gas Analysis | S removal, W % Liquid Analysis |
|---|---|---|---|---|---|---|
| Cu—Zn—Al (1) | 600 | 30 | 15600 | 6 | 16 | 40 |
| Cu—Zn—Al (1) | 580 | 30 | 19900 | 6 | 44 | 41 |

Example 19

This, and the examples which follow, deal with the regeneration of spent catalysts after adsorptive removal of sulfur was carried out.

After the experiments described in Example 17, supra, were carried out, the catalyst was examined and FTIR data showed that it contained 6.5 wt. % sulfur in the form of sulfates and sulfites, as well as bulk copper sulfide ($Cu_{1.96}S$ and $Cu_7S_4$), as determined by XRD data. The spent catalyst also contained 11.5 wt. % carbon.

The catalyst was regenerated by treatment at 350° C. for 4 hours with oxygen-containing gas with the oxygen content being increased gradually from 1 vol. % to 20 vol. %. Finally, the sample was calcined at 800° C. under air, for 4 hours.

The regenerated catalyst had the following chemical composition in wt. %: Cu—36.0; Zn—12.1; Al—14.2; Na—0.02. The sulfur and carbon content in the catalyst were less than 0.3 and 0.1 wt. %, respectively. The catalyst had specific surface area 75 $m^2$/g, pore volume 0.30 $cm^3$/g and prevailing pore diameter equal to 12 nm. The catalyst phase composition exhibited a highly dispersed, spinel phase with lattice parameter a=8.02-8.1 Å and a crystal phase of CuO. The spinel phase exhibited particles with a size distribution of 2-10 nm (HRTEM data), and had a chemical composition $Cu_{0.3}Zn_{0.7}Al_2O_4$ as determined by EDX analysis.

Example 20

Another sample of the spent catalyst of Example 17 was regenerated in an alternative method. Specifically, the sample was regenerated by treatment at 400° C. with a steam-nitrogen-oxygen mixture for 4 hours. The steam content of the mixture was 10 vol. % and the oxygen content was in the range 1-5 vol. %.

The regenerated catalyst was identical in composition to that of Example 19.

Example 21

Example 14, supra, describes using different catalysts to desulfurize different materials. In this example, the spent catalyst represented by "Cu—Zn—Al(2)," as used to remove sulfur from DBT in toluene was regenerated. Prior to regeneration, the spent catalyst was determined to contain 2.3 wt. % sulfur, and 7.3 wt. % carbon.

The sample was regenerated by treatment under a hydrogen-containing gas mixture (5 vol. % $H_2$ in nitrogen), with the temperature being increased from 120° C. to 530° C. at a rate 60-120° C./hr. Finally the sample was hydrotreated at 530° C. for 2 hours.

The regenerated catalyst had the following composition in wt. %:Cu—26.3; Zn—15.8; Al—22.3. The sulfur and carbon contents were less than 0.5 and 2.0 wt. %, respectively. The catalyst had a specific surface area 70 $m^2$/g, pore volume 0.27 $cm^3$/g and prevailing pore diameter equal to 11 nm. The catalyst phase composition exhibited a highly dispersed spinel phase with a lattice parameter a=8.02-8.2 Å and a crystal phase of $Cu^0$ and $Cu_2O$.

Example 22

A second sample of the spent catalyst discussed in Example 21 was regenerated, by treatment at 360° C. for 2 hours under a hydrogen-containing gas mixture (5 vol. % $H_2$ in nitrogen), with the temperature increased from 120° C. to 360° C. at a rate 60-90° C./hrs. Then, the sample was kept at 350° C. under an inert gas for 1 hour and under air flow for 2 hours.

The regenerated catalyst had the same composition as that of Example 21, and sulfur and carbon content less than 0.5 and 0.4 wt. %. The catalyst had a specific surface area of 75 $m^2$/g, a pore volume of 0.33 $cm^3$/g and a prevailing pore diameter of 12 nm. The catalyst phase composition exhibited by a highly dispersed spinel phase with a lattice parameter a=8.02-8.2 Å and a crystal phases of CuO.

Example 23

The catalyst represented by "Cu—Zn—Al(3)" and used the same way Cu—Zn—Al(2) was used, as discussed in Examples 21 and 22, was regenerated via high temperature pyrolysis. Prior to the treatment, the spent catalyst contained 2.2 wt. % surface $SO_4^{2-}+SO_3^{2-}$, and 8.3 wt. % carbon.

This sample was regenerated by high temperature pyrolysis at 760° C. under an inert atmosphere, for 4 hours, resulting in calcination.

The calcined catalyst had the following composition in wt. %: Cu—20.9; Zn—17.1; Al—23.9; Ce—0.5. The sulfur and carbon contents were less than 0.3 and 2.5 wt. % (the carbon was in the form of carbonates), respectively. The catalyst had a specific surface area 70 $m^2$/g, pore volume 0.17 $cm^3$/g and prevailing pore diameter equal to 8.5 nm. The catalyst phase composition exhibited by a highly dispersed spinel phase with a lattice parameter a=8.02-8.2 Å, an chemical composition $Cu_{0.5}Zn_{0.5}Al_2O_4$, and a crystal phase of CuO.

The foregoing examples describe features of the invention which include a catalytic composition useful, e.g., in oxidative and/or adsorptive removal of sulfur from gaseous, sulfur containing hydrocarbons, as well as processes for making the compositions, and their use.

The catalytic compositions comprise oxides of copper, zinc, and aluminum in defined weight percent ranges, and may also contain cerium oxide. The compositions exhibit an X-ray amorphous oxides phase with highly dispersed oxides of Zn, Cu, and optionally Ce.

As noted, supra, the compositions contain defined amounts of the metallic oxides. The weight percentages permitted by the invention are 5 to less than 20 weight percent zinc oxide, from 10 to 50 weight percent copper oxide, and from 20 to 70 weight percent of aluminum oxide. When cerium oxide is present, its amount can range from 0.1 to 10 wt percent of the composition.

The aforementioned structure has a lattice parameter corresponding to spinel, according to HRTEM data and the chemical formula $Cu_xZn_{1-x}Al_2O_4$, found from EDX analysis which is in accordance with the standard formula for spinels, i.e., "$MAl_2O_4$," where "M" signifies a metal or combination of metals. Within the spinel, the ZnO and CuO are present as highly dispersed crystals. If cerium oxide is present, it is in particle form, with particles ranging in diameter from 5 nm to 10 nm. Preferably, X ranges from 0.1 to 0.6, more preferably, from 0.2 to 0.5.

The composition of the invention preferably are granular in nature, and may be formed into various embodiments such as a cylinder, a sphere, a trilobe, or a quatrolobe, preferably via processes discussed infra. The granules of the compositions preferably have diameters ranging from 1 mm to 4 mm.

The compositions preferably have specific surface areas ranging from 10 $m^2$/g to 100 $m^2$/g, more preferably 50 $m^2$/g to 100 $m^2$/g, with pores ranging from 8 nm to 12 nm, more preferably, 8 nm to 10 nm. In preferred embodiments, the weight percentages are: 20-45CuO, 10→20ZnO, and 20-70Al$_2$O$_3$, and most preferably 30-45 CuO, 12→20ZnO, and 20-40Al$_2$O$_3$.

The catalytic compositions of the invention are made by preparing an aqueous solution of the nitrates of Cu, Zn, and Al, and optionally Ce, and then combining this solution with an aqueous alkaline solution which contains NaOH, and/or one or more of (NH$_4$)$_2$CO$_3$, Na$_2$CO$_3$ and NH$_4$HCO$_3$.

These solutions are combined at a temperature which may range from about 50° C. to about 65° C., and at a pH of from about 6.5 to about 14. The resulting hydroxides, carbonates, and/or hydroxycarbonates precipitate and are then filtered, washed, and dried, for at least ten hours, at a temperature of at least 100° C. After this, the resulting dried material is calcined, for about 2-4 hours, at a temperature of at least 450° C., to form the composition described herein.

The precipitate may be aged prior to the filtering and washing, as elaborated in the examples.

It is frequently desirable to form composites of the catalytic composition, and this is preferably done by adding a binder to the compositions prior to calcination. The binder may be, e.g., polyethylene oxide, polyvinyl alcohol, aluminum pseudoboehmite, silica gel, or mixtures thereof. The binder may be added in amounts ranging from about 1 wt % to about 20 wt % of the precipitate, preferably from 1-10 wt. % or in the case of hydroxides 3-20 wt. %. The resulting mixture may be extruded through, e.g., a forming die, and then dried, preferably at room temperature, for 24 hours, followed by drying at about 100° C. for 2-4 hours. The extrusion product is then heated slowly, e.g., by increasing temperatures by 2-5° C. every minute until a temperature of 500° C. is reached, followed by calcination at 500° C. for 2-4 hours.

In practice, the compositions are used by combining them with a sulfur containing hydrocarbon, in gaseous form, together with an oxygen source, for a time sufficient for at least a portion of the sulfur to be oxidized to, e.g., SO$_2$. The oxygen source is preferably pure oxygen, but may be air, or any other oxygen source. Preferably, the materials recited supra are combined at conditions which include pressure of from 1-bars, temperature of from 200° C. to 600° C., with a weight hourly space velocity of from 1-20 h$^{-1}$, gas hourly space velocity of from 1,000-20,000 h$^{-1}$, with an oxygen carbon molar ratio of from 0.01 to 0.1, and a molar ratio of oxygen and sulfur of from 1 to 150. Preferably, the pressure ranges from 1-10 bars, most preferably 1-5 bars, the temperature is preferably from 250-500° C., and is most preferably 300-500° C. The gas hourly space velocity is preferably 5,000-15,000 h$^{-1}$, most preferably 5,000 to 10,000 h$^{-1}$, while the preferred molar ration of O$_2$/C ranges from 0.02-0.1, and most preferably from 0.05-0.1, while that of O$_2$/S is from 10-100, and most preferably, from 20-50.

The feedstock, i.e., the sulfur containing hydrocarbon, will vary, but preferably is one with a boiling point above 36° C., and even more preferably, above 565° C.

In practice, the catalytic compositions are used in the form of, e.g., fixed beds, ebullated beds, moving beds, or fluidized beds.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A method for removing a portion of sulfur contained in a hydrocarbon, comprising contacting said sulfur containing hydrocarbon in gaseous form to a catalytic composition comprising copper oxide in an amount ranging from 20 weight percent (wt %) to 45 wt %, zinc oxide in an amount ranging from 12 wt % to less than 20 wt %, CeO$_2$ in the form of particles ranging in diameter from 5 nm to 10 nm, in an amount ranging from 0.1 wt % to 10 wt % and aluminum oxide in an amount ranging from 20 wt % to 40 wt %, wherein said catalytic composition has an X-ray amorphous oxide phase, and a formula Cu$_x$Zn$_{1-x}$Al$_2$O$_4$ wherein x ranges from 0 to 1, highly dispersed crystalline ZnO and CuO, said contacting occurring in the presence of pure oxygen at a gas hourly space velocity (GHSV) of from 1,000 to 20,000 h$^{-1}$, said catalytic composition prepared by:

(i) combining an aqueous solution containing each of copper nitrate, zinc nitrate, and aluminum nitrate with an alkaline solution containing NaOH and/or at least one of (NH$_4$)$_2$CO$_3$, Na$_2$CO$_3$ and NH$_4$HCO$_3$, at a temperature of from about 50° C. to about 65° C., and a pH of from about 6.5 to about 14, to form a precipitate containing at least one of (a) a carbonate containing Cu, Zn, and Al, (b) a hydroxide containing Cu, Zn, and Al, and (c) a hydroxycarbonate containing Cu, Zn, and Al;

(ii) aging said precipitate;

(iii) filtering and washing said precipitate;

(iv) drying said precipitate for at least 10 hours, at a temperature of at least 100° C.; and (v) combining the precipitate with a binder selected from the group consisting of poly-ethylene oxide, polyvinyl alcohol, a sol of aluminum pseudoboehmite, silica gel and mixtures thereof, said binder being added in amount ranging from 1 to 10 weight % of said precipitate, to from an extrudable mixture, extruding said mixture through a die to form an extrudate drying said extrudate for 24 hours at room temperature, followed by drying said extrudate at 100° C. for from 2-4 hours, and raising temperature to 500° C., at a rate of from 2-5° C./minute, to calcine said extrudate for from 2-4 hours.

2. The method of claim 1, comprising oxidizing sulfur in said sulfur containing hydrocarbon.

3. The method of claim 1, comprising adsorbing a sulfur containing compound into said catalyst.

4. The method of claim 1, further comprising regenerating said catalyst.

5. The method of claim 1, wherein said catalytic composition is in granular form.

6. The method of claim 5, wherein pores of granules have a diameter of from 8 nm to 12 nm.

7. The method of claim 6, wherein pores of the granules of said composition have a volume of from about 0.1 cm$^3$/g to about 0.5 cm$^3$/g.

8. The method of claim 6, wherein said pores of said catalytic composition have a diameter of from 8 nm to 10 nm.

9. The method of claim 1, wherein said catalytic composition is formed as a cylinder, a sphere, a trilobe, or a quatrolobe.

10. The method of claim 5, wherein said catalytic composition is in the form of granules having a diameter of from 1 mm to 4 mm.

11. The method of claim 1, wherein said catalytic composition has a specific surface area of from 10 $m^2/g$ to 100 $m^2/g$.

12. The method of claim 11, wherein said catalytic composition has a specific surface area of from 50 $m^2/g$ to 100 $m^2/g$.

13. The method of claim 1, wherein X is from 0.1 to 0.6.

14. The method of claim 13, wherein X is from 0.2 to 0.5.

15. The method of claim 1, wherein said GHSV is from 5,000 $h^{-1}$ to 15,000 $h^{-1}$.

16. The method of claim 15, wherein said GHSV is from 5,000 $h^{-1}$ to 10,000 $h^{-1}$.

17. The method of claim 1, wherein said GHSV is 1,000 $h^{-1}$ or more and less than 3,000 $h^{-1}$.

* * * * *